United States Patent [19]
Johnson et al.

[11] Patent Number: 5,916,413
[45] Date of Patent: Jun. 29, 1999

[54] WELDING DEVICE HAVING A HEATING DEVICE FOR HEATING THERMOPLASTIC FIBER COMPOSITE MATERIAL TAPES

[75] Inventors: Bruce Johnson, Untersiggenthal; Vishal Mallick, Birmenstorf; François Meynard, Toinex, all of Switzerland

[73] Assignee: ABB Research Ltd., Zurich, Switzerland

[21] Appl. No.: 08/880,647

[22] Filed: Jun. 23, 1997

[30] Foreign Application Priority Data

Jul. 3, 1996 [DE] Germany ............................ 196 26 662

[51] Int. Cl.$^6$ ...................................................... B65H 81/00
[52] U.S. Cl. ........................... 156/441; 156/425; 156/433; 156/499; 156/523; 156/574
[58] Field of Search ...................... 156/361, 359, 156/499, 523, 574, 425, 441, 433

[56] References Cited

U.S. PATENT DOCUMENTS 4,569,716  2/1986  Pugh ..................... 156/574 X
5,078,592  1/1992  Grimshaw et al. ................. 156/359 X
5,078,821  1/1992  Garvey et al. .................... 156/272.2 X
5,700,347  12/1997  McCowin ............................ 156/574 X

FOREIGN PATENT DOCUMENTS 1807379    10/1970  Germany.
3043165A1   6/1981  Germany.
3206804A1   9/1982  Germany.
3911360A1  10/1990  Germany.

*Primary Examiner*—Jeff H. Aftergut
*Attorney, Agent, or Firm*—Burns, Doane, Swecker & Mathis, L.L.P.

[57] ABSTRACT

In a welding device having a heating device (14) for heating thermoplastic fiber composite material tapes (15, 16), the surfaces of the thermoplastic fiber tapes (15, 16) are melted by means of the heating device (14) in order to weld the thermoplastic fiber tapes (15, 16) to each other. At least one extended heating element is arranged on the heating device (14).

8 Claims, 2 Drawing Sheets

WELDING DEVICE HAVING A HEATING DEVICE FOR HEATING THERMOPLASTIC FIBER COMPOSITE MATERIAL TAPES

BACKGROUND OF THE INVENTION

1. Field of the Invention

The invention relates to a welding device having a heating device for heating thermoplastic fiber composite material tapes, according to the preamble of the first claim.

2. Discussion of Background

In order to connect together thermoplastic fiber composite material tapes having a thermoplastic matrix and fiber materials, such as carbon or glass fibers, embedded therein, in a continuous process the mutually facing surfaces of the tapes are melted locally at the point where they are led together and the tapes are welded to each other. The thermal energy is in this case concentrated on the point where the tapes are led together. The advance speed and hence the welding speed is, however, relatively low in this case and can be up to 20 mm/s. The time needed in order to heat a thermoplastic fiber tape is proportional to the square of the thickness of the thermoplastic fiber tape, inversely proportional to the thermal conductivity of the thermoplastic matrix and a function of the heat transfer at the surface.

SUMMARY OF THE INVENTION

Accordingly, one object of the invention, in the case of a welding device having a heating device for heating thermoplastic fiber composite material tapes of the type mentioned at the outset, to increase the advance speed and hence the welding speed.

According to the invention, this is achieved by means of the features of the first claim.

The nucleus of the invention is therefore that at least one extended heating element is arranged on the heating device.

The advantages of the invention can be seen, inter alia, in that by means of this heating device the thermoplastic fiber tapes are heated in a deliberate manner, over a large area and therefore rapidly, as a result of which high welding speeds can be achieved. By this means, high productivity can be achieved.

It is advantageous that the heating device comprises at least two separately controllable part heating devices, on which at least one heating element is arranged in each case. As a result of the dividing of the heating device into part heating devices, the heating of the tapes to be connected can be controlled independently of each other, by which means a further increased quality of the laminate and of the connection is achieved. Furthermore, as a result of the heating device according to the invention, the consumption of heat is reduced, which reduces the costs of the produced tapes.

Further advantageous refinements of the heating device emerge from the subclaims. Thus, by means of the deliberate use of the heating gas, the quantity of the gas needed is reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements which are essential for the understanding of the invention are shown. Not shown, for example, are the monitoring devices and the electricity and hot-gas supply to the device.

DESCRIPTION OF THE PREFERRED EMBODIMENTS

Figure 1:
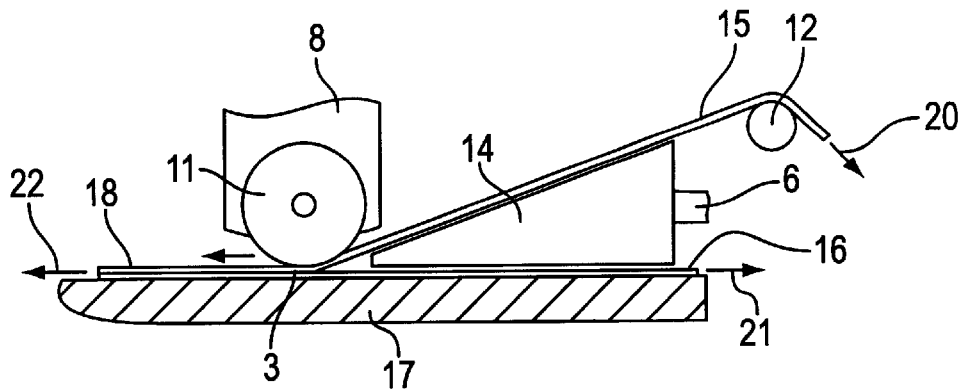
FIG. 1 shows a side view of a device for connecting thermoplastic fiber tapes.

Referring now to the drawings, wherein like reference numerals designate identical or corresponding parts throughout the several views, in FIG. 1 a thermoplastic fiber tape 15 and a thermoplastic fiber tape 16 are unwound from binding material reels, not shown. The thermoplastic fiber tape 15 is conveyed over a guide roller 12 to a heating device 14. The thermoplastic fiber tape 16 is conveyed over a base plate 17 to the heating device 14. The heating device 14 has a feed line 6 for feeding hot gases. By means of the heating device 14, the thermoplastic fiber tape 15 and 16 is heated, on the surfaces facing the heating device, to at least the melting point of the thermoplastic matrix of the thermoplastic fiber tapes. Hence, the fiber tape is heated above the melting point of the thermoplastic matrix only over a fraction of its thickness. By means of a press roller 11 and via a pressure cylinder 8, the fiber tapes 15, 16 are pressed against each other and thus the melted surface of the thermoplastic fiber tape 15 is pressed onto the melted surface of the thermoplastic fiber tape 16. By this means, the thermoplastic fiber tapes 15 and 16 are continuously welded to each other at a welding area 3 which is defined by the press roller, which results in a multilayer fiber tape 18. During this process, a tensile force 20, 21 can be exerted on the thermoplastic fiber tapes 15, 16 and a tensile force 22 on the resulting fiber tape 18. The fiber tapes 15 and 16 can therefore be applied to each other under a certain pretension. Of course, further thermoplastic fiber tapes 15, 16 can be applied to the resulting fiber tape 18.

The thermoplastic fiber composite material tapes 15, 16 comprise a thermoplastic matrix with fibers embedded therein, the fiber content being able to amount to over 60% by volume. Any thermoplastics which satisfy the corresponding requirements can be used as the thermoplastic matrix, preferably aromatic plastics, in particular polyether ether ketone or polyether imide. The thermoplastic fiber tapes 15 and 16 may have a different matrix and different fibers. Any fiber materials which have a correspondingly selected tensile strength, preferably carbon fibers or glass fibers, can be used as the fibers.

TABLE 1

| Ex. | Material | Fiber type | Matrix | Density (g/cm$^3$) | Tensile strength (MPa) | Modulus of elasticity (GPa) |
|---|---|---|---|---|---|---|
| a | QLG4068 | Glass | PPS | 1.65 | 1110 | 44 |
| b | QLC4160 | Carbon | PPS | 1.5 | 1837 | 114 |
| c | QLC4064 | Carbon | PPS | 1.5 | 1950 | 121 |

TABLE 1-continued

| Ex. | Material | Fiber type | Matrix | Density (g/cm³) | Tensile strength (MPa) | Modulus of elasticity (GPa) |
|---|---|---|---|---|---|---|
| d | PEI-S2 | Glass | PEI | 1.6 | 1170 | 55 |
| e | APC2-S2 | Glass | PEEK | 1.6 | 1170 | 55 |
| f | APC2-AS4 | Carbon | PEEK | 1.5 | 2070 | 140 |

In Table 1, the material properties of a few selected examples of thermoplastic fiber composite material tapes are shown. The tapes shown in the table comprise glass or carbon fibers and a matrix made of polyphenylene sulfide (PPS), polyether imide (PEI) or polyether ether ketone (PEEK). The tapes with the designations a, b, c are produced by the Quadrax company, the tapes with the designations d, e, f by the ICI Fiberite company.

The maximum temperature of use of the tapes from Examples a, b, c, and d is about 200° C., that of the Examples e and f is about 240° C. PEEK is normally processed at about 400° C. and PPS at about 340° C.

Figure 2:
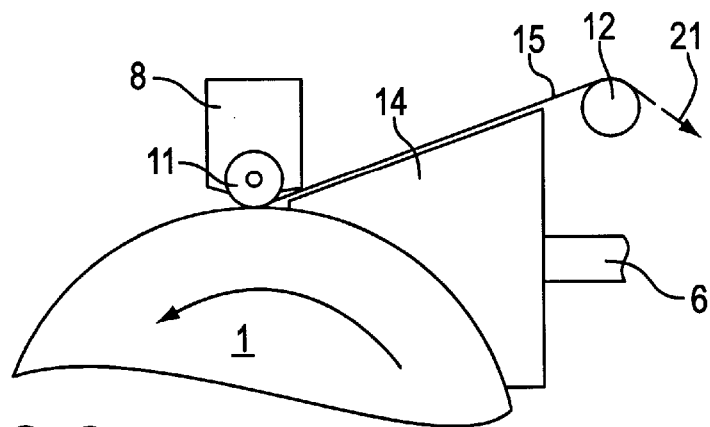
FIG. 2 shows a side view of a device for the application of thermoplastic fiber tapes to a rotationally symmetrical body.

According to FIG. 2, the thermoplastic fiber tape 15 can also be applied to a rotationally symmetrical body, in particular a rotor of an electric machine. The side of the heating device 14 resting against the rotationally symmetrical body 1 is then constructed to correspond to the body 1, so that a thermoplastic fiber tape 15 which is located on the body 1 can also be heated. If the rotationally symmetrical body 1 is a winding overhang of a rotor of an electric machine, bindings for retaining the winding overhang can be produced by means of the application of the thermoplastic fiber tape 15.

Figure 3:
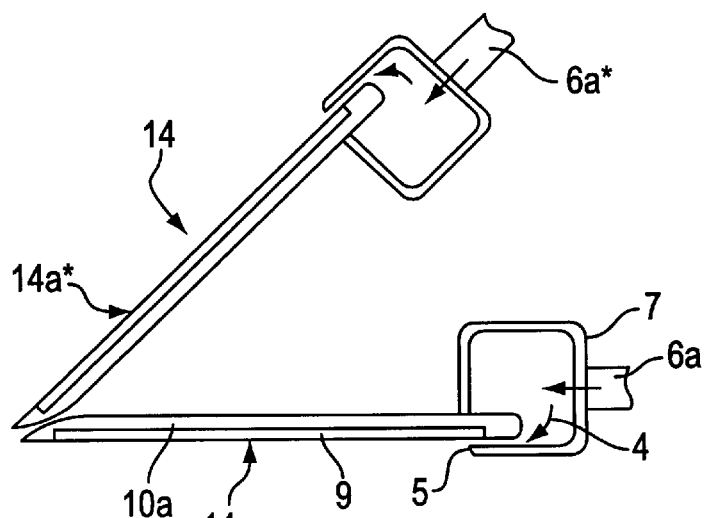
FIG. 3 shows a partial longitudinal section of a heating device.

According to FIG. 3, the heating device 14 comprises a part heating device 14a and a constructionally identical part heating device 14a*, by means of which the thermoplastic fiber tapes which are led past the heating device 14 are heated. The part heating devices 14a, 14a* are connected to each other via holders, not shown. The connection can be constructed to be movable here, so that the part heating devices can be displaced toward each other. The part heating devices 14a, 14a* are arranged at an acute angle to each other, said angle being determined by the feed of the thermoplastic fiber tapes.

The part heating device 14a comprises a support element 10a and a heating element arranged thereon, a heating foil 9. In this case the heating foil may be an electric or an infrared heating foil. The heating foil 9 extends at least over the width of the thermoplastic fiber tape 15, 16. At the end of the support element 10a opposite the welding area 3 there is arranged a duct 7 which has a slotted nozzle 5. Via a feed line 6a, hot gas 4 is conducted into the duct 7, said gas being conducted via the slotted nozzle 5 to the surface of the thermoplastic fiber tape. The flow direction of the hot gas emerging from the slotted nozzle corresponds to the conveying direction of the thermoplastic fiber tape. The thermoplastic fiber tape is thus heated by a combination of radiation heating by means of the heating foil 9 and convection heating by means of the hot gas 4 fed via the slot 5. In addition, as a result of the injection of the hot gases 4 via the slot 5, an air cushion is produced above the heating foil 9, which prevents the melted thermoplastic fiber tape sticking to the heating foil and hence to the heating device. Not illustrated are part heating devices 14a, 14a*, in which the convection heating, that is to say the duct 7, is left out. The thermoplastic fiber tape is then heated only by the radiation heating by means of the heating foil 9. By means of the heating device formed by the part heating devices 14a and 14a*, welding speeds of up to above 300 mm/s can be achieved.

The part heating devices 14a and 14a* are in this case individually controllable, that is to say the thermal energy emitted in each case to the thermoplastic fiber tapes can be set individually. Thus, for example, in FIG. 2 thermal energy can be dissipated via the rotor 1, for which purpose more thermal energy is supplied by means of the part heating device assigned to the rotor.

Figure 4:
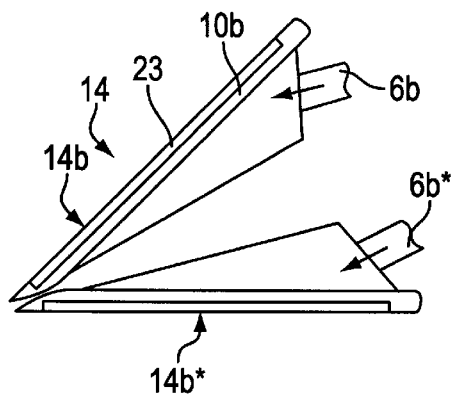
FIG. 4 shows a partial longitudinal section of a further heating device.

According to FIG. 4, the heating device 14 may also comprise a part heating device 14b and a constructionally identical part heating device 14b*. The part heating devices 14b, 14b* are connected to each other via holders, not shown. The connection can be configured to be moveable here, so that the part heating devices can be displaced toward each other. The part heating devices 14b, 14b* are arranged at an acute angle to each other, said angle being determined by the feed of the thermoplastic fiber tapes.

The part heating device 14b comprises a support element 10b and a perforated plate 23 arranged thereon. In this arrangement the perforated plate 23 extends at least over the width of the thermoplastic fiber tape 15, 16. Via a feed line 6b, hot gas 4 is conducted via ducts, not shown in more detail, to the support element 10b and hence to the perforated plate 23. It is of course also possible for a duct to be arranged here having a slotted nozzle for the convective heating of the thermoplastic fiber tape.

Figure 5:
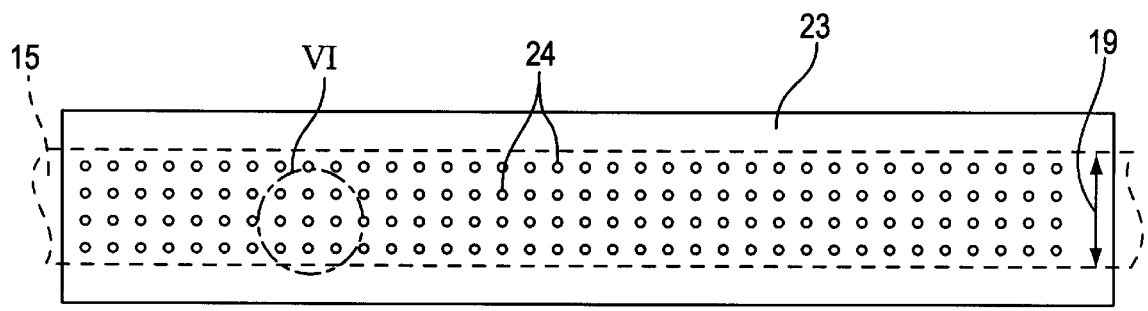
FIG. 5 shows a plan view of a perforated plate.
Figure 6:
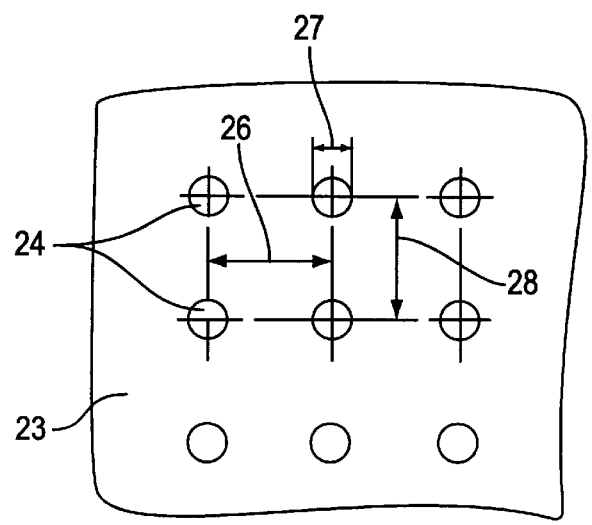
FIG. 6 shows the detail VI from FIG. 5.

According to FIGS. 5 and 6, a plurality of holes 24 are arranged in the perforated plate 23, and serve as impinging-flow nozzles. The thermoplastic fiber tape is thus heated by impinging-flow heating by means of the hot gas 4 conducted through the holes 23. The arrangement of the holes 24, their hole diameter 27 and the distance of the perforated plate 23 from the thermoplastic fiber tape is in this case decisive for the convective heat transfer.

As a rule of thumb, it can be stated that at least two holes 24 should be arranged over one width 19 of the thermoplastic fiber tape. The spacings of the holes 24 on the perforated plate 23 in the longitudinal and in the transverse direction should be approximately between two and ten times the hole diameter 27. The distance of the thermoplastic fiber tape from the perforated plate 23 should be between two and eight times the hole diameter 27. For the abovementioned types of thermoplastic fiber tapes, the temperature of the hot gases conducted through the holes 24 should be between 500 and 900° C., and the flow speed should be between 0.1 and 30 m/s, in particular between 1 and 20 m/s.

In addition, the perforated plate 23 can also be further heated, in particular this can be performed electrically. As a result, on the one hand the thermoplastic fiber tape is heated via the perforated plate and, on the other hand the gases conducted through the holes 24 are heated or at least cooling of the gases conducted through the holes is prevented.

As a result of the injection of the gases through the holes 24, in addition an air cushion is produced above the perforated plate 23, which prevents the melted thermoplastic fiber tape sticking to the perforated plate and hence to the heating device.

By means of the heating device formed from the part heating devices 14b and 14b*, welding speeds of up to over 300 mm/s can be achieved.

The invention is of course not restricted to the embodiment shown and described. The heating device can also be formed by a combination of the part heating devices 14a and 14*b*. The feed line 6 can be replaced by a plurality of feed lines. The geometry of the part heating devices 14*a*, 14*b*, and respectively of the heating elements 9, 23 is in each case configured to correspond to the geometry of the element 1, 17 onto which the fiber tapes are being applied.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by: Letters Patent of the United States is:

1. A welding device having a heating device for heating thermoplastic fiber composite material tapes, surfaces of the thermoplastic fiber tapes being melted by means of the heating device in order to weld the thermoplastic fiber tapes to each other, wherein at least one extended heating element, and wherein the heating device comprises a support element having, at an opposite end from a welding area of the thermoplastic fiber tapes, at least one duct having a slotted nozzle.

2. The welding device as claimed in claim 1, wherein the heating device comprises at least two separately controllable part heating devices, on which at least one heating element is arranged in each case.

3. The welding device as claimed in claim 2, wherein the part heating devices each comprise a support element on which said at least one heating element is arranged.

4. The welding device as claimed in claim 1, wherein the heating element is a heating foil, which radiates thermal energy.

5. The welding device as claimed in claim 1, wherein the heating element is a perforated plate with holes constructed as impinging-flow nozzles.

6. The welding device as claimed in claim 5, wherein at least one feed line for hot gases is arranged on the heating device.

7. The welding device as claimed in claim 3, wherein the slotted nozzle is arranged between the thermoplastic fiber tape and the support element.

8. The welding device as claimed in claim 5, wherein a distance of the thermoplastic fiber tape from the perforated plate is between two and eight times a diameter of the holes in the perforated plate.

* * * * *